(12) United States Patent
Chen

(10) Patent No.: US 8,600,044 B2
(45) Date of Patent: Dec. 3, 2013

(54) SUPPORTING DEVICE AND TELEPHONE DEVICE

(75) Inventor: Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/596,105

(22) Filed: Aug. 28, 2012

(65) Prior Publication Data

US 2013/0108037 A1   May 2, 2013

(30) Foreign Application Priority Data

Oct. 31, 2011  (CN) .......................... 2011 1 0337136

(51) Int. Cl.
*H04M 1/02* (2006.01)
*H04M 1/06* (2006.01)
*H04M 1/08* (2006.01)

(52) U.S. Cl.
CPC *H04M 1/06* (2013.01); *H04M 1/02* (2013.01); *H04M 1/08* (2013.01)
USPC ............ 379/446; 379/448; 379/449; 379/455

(58) Field of Classification Search
USPC .......................... 379/441, 446–449, 454, 455
See application file for complete search history.

(56) References Cited

U.S. PATENT DOCUMENTS

| 5,463,688 | A  | * | 10/1995 | Wijas ............................. 379/446 |
| 5,841,858 | A  | * | 11/1998 | Frierson ........................ 379/430 |
| 7,961,870 | B2 | * | 6/2011  | Lucey et al. ................... 379/447 |
| 2004/0131174 | A1 | * | 7/2004 | Lucey et al. ............. 379/373.01 |

\* cited by examiner

*Primary Examiner* — Tuan D Nguyen
(74) *Attorney, Agent, or Firm* — Altis & Wispro Law Group, Inc.

(57) ABSTRACT

A telephone device comprises a base, a handset, and a supporting device secured to the base. The base comprises a first receiving portion and a hang-up button protruding out of the first receiving portion. The hang-up button is used for ending a call when being pressed. The handset comprises an earpiece received in the first receiving portion. When the supporting device is in a resisting position, the supporting device extends into the first receiving portion for supporting the earpiece to prevent the earpiece from pressing the hang-up button. When the supporting device is in an unresisting position, the supporting device retracts into the base for allowing the earpiece to press the hang-up button.

18 Claims, 5 Drawing Sheets

SUPPORTING DEVICE AND TELEPHONE DEVICE

BACKGROUND

1. Technical Field

The present disclosure relates to a supporting device; and particularly, to a telephone device using the supporting device for preventing a call from being ended.

2. Description of Related Art

Oftentimes, when a user is on a telephone call but needs to tend to other tasks, the user usually put the handset on the desktop or other nearby objects, to prevent the call from being ended. However, this may occupy space on the desktop.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
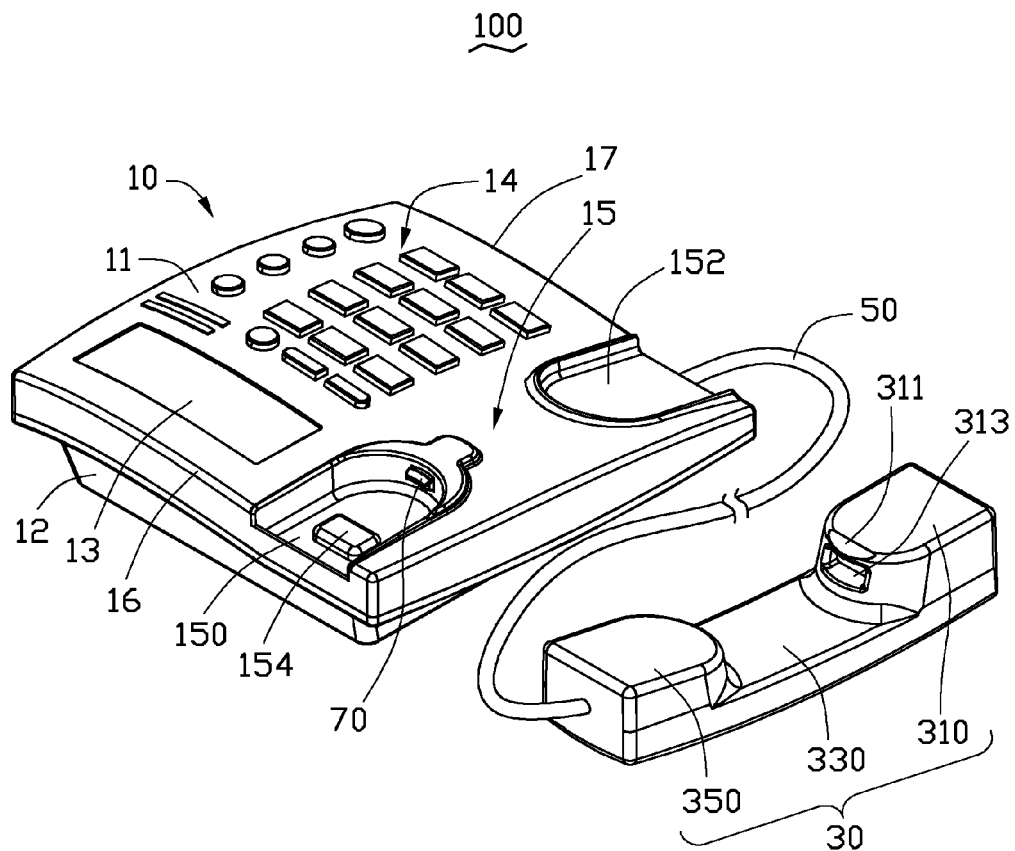
FIG. 1 is an isometric view of an embodiment of a telephone device.
Figure 2:
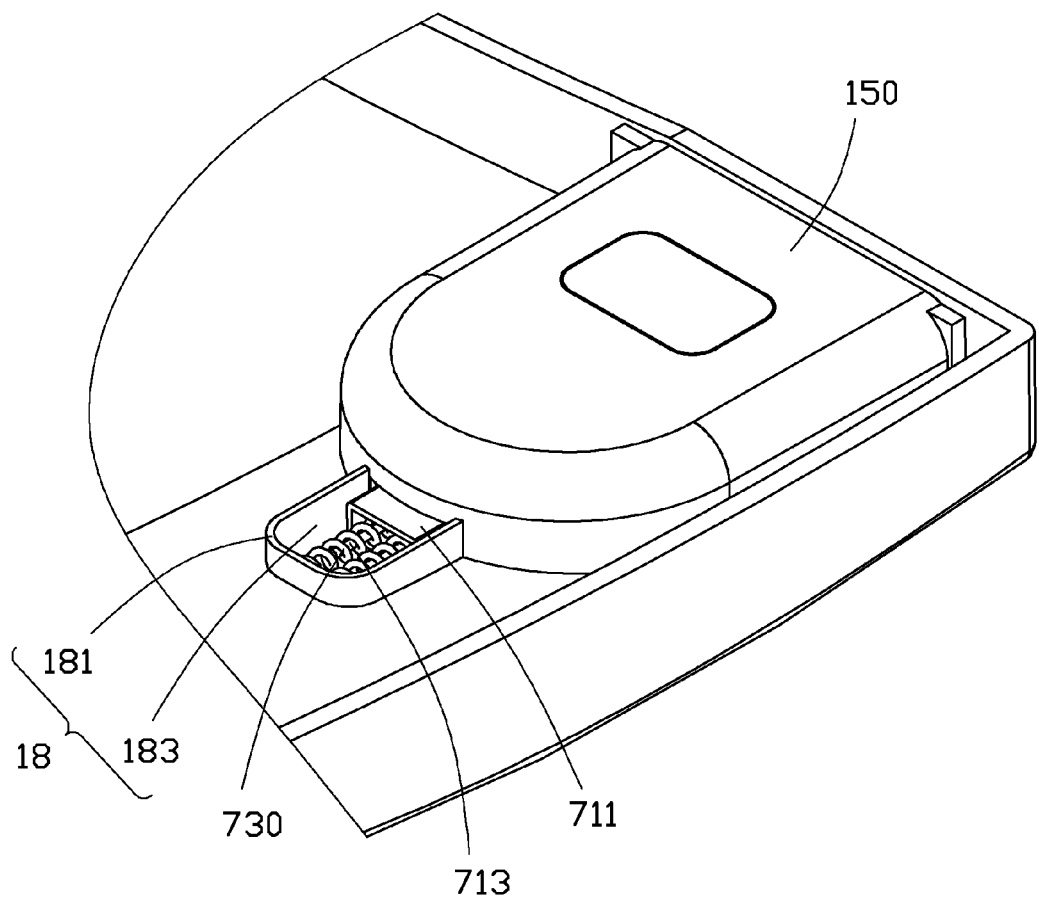
FIG. 2 is a partial, isometric view of the telephone device of FIG. 1.

FIGS. 1 and 2 illustrate an embodiment of a telephone device 100. The telephone device 100 includes a base 10, a handset 30, a telephone cord 50, and a supporting device 70. The telephone cord 50 electrically connects the base 10 with the handset 30. The supporting device 70 is mounted to the base 10 for engaging with the handset 30.

The base 10 is rectangular-shaped, and includes a top cover 11, a bottom cover 12 connected to the top cover 11, a display screen 13, a plurality of keys 14, and a placement portion 15. The top cover 11 includes a first rim 16 and a second rim 17 opposite to the first rim 16. The display screen 13, the keys 14, and a placement portion 15 are arranged on the top cover 11 between the first and second rims 16, 17. The display screen 13 is arranged adjacent to the first rim 16 for displaying information, for example, telephone numbers, time, and other information. The keys 14 are arranged between the display screen 13 and the second rim 17, for inputting a telephone number or setting the function of the telephone device 100.

The placement portion 15 is arranged abreast of the display screen 13 and the keys 14. The placement portion 15 includes a first receiving portion 150, a second receiving portion 152, and a hang-up button 154. The first receiving portion 150 is adjacent to the first rim 16 and defines a through hole 1501 (shown in FIG. 3). The second receiving portion 152 is spaced from the first receiving portion 150 and is adjacent to the second rim 17. The hang-up button 154 is used for ending a call when being pressed, and is capable of protruding out of the bottom of the first receiving portion 150 when released. In the embodiment, the first receiving portion 150 and the second receiving portion 152 are recessed in the top cover 11.

A restriction portion 18 is secured to an inner surface of the top cover 11 and connects with an end of the first receiving portion 150 near the second receiving portion 152. The restriction portion 18 includes three sidewalls 181. The three sidewalls 181 serially interconnect to cooperatively define a substantially U-shaped receiving groove 183. The restriction portion 18 connects to the first receiving portion 150 with the opening end communicating with the through hole 1501.

The handset 30 is capable of being placed on the placement portion 15. The handset 30 includes an earpiece 310, a mouthpiece 350, and a connecting portion 330 connecting between the earpiece 310 and the mouthpiece 350. When the handset 30 is placed on the placement portion 15, the earpiece 310 is received in the first receiving portion 150, and the mouthpiece 350 is received in the second receiving portion 152. An end of the earpiece 310 adjacent to the mouthpiece 350 defines a recess portion 313. When the handset 30 is placed on the placement portion 15, the recess portion 313 is received in the first receiving portion 150. An end of the earpiece 310 adjacent to the mouthpiece 350 further defines a resisting portion 311. The resisting portion 311 is arranged at a side of the recess portion 313 away from the connecting portion 330. In the embodiment, the resisting portion 311 is an inclined surface.

Figure 3:
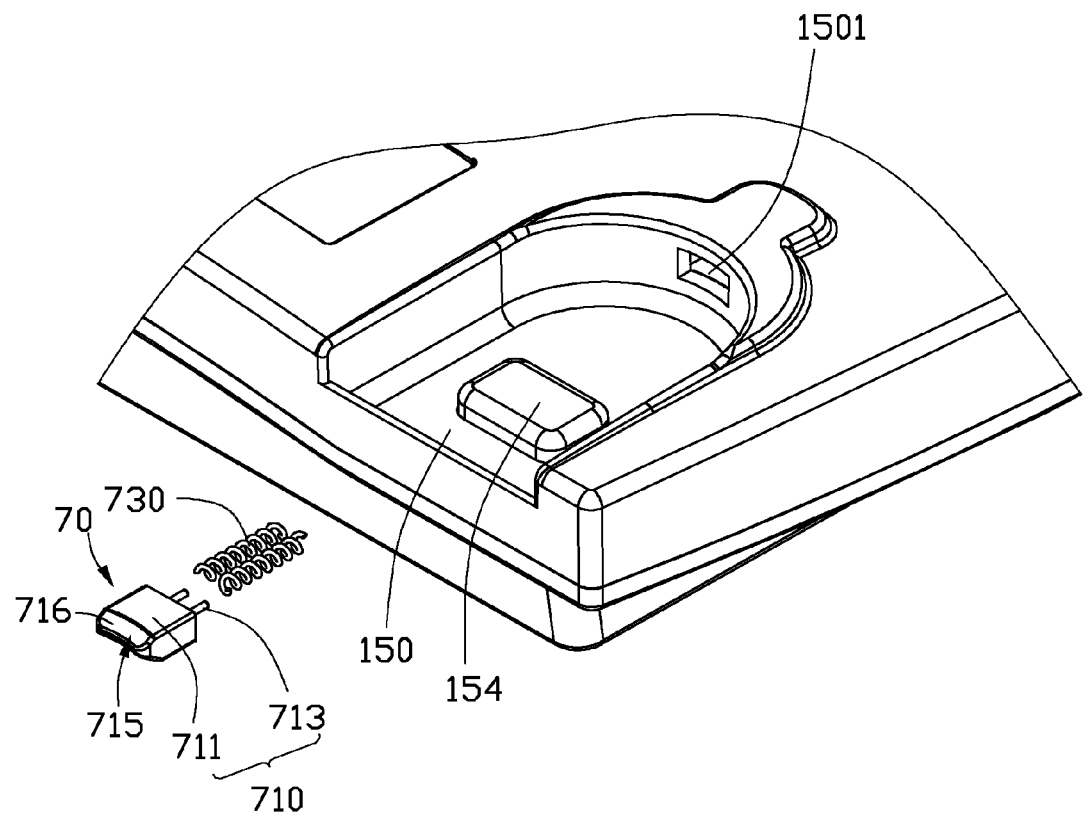
FIG. 3 is a partial, exploded view of the telephone device of FIG. 1.

Referring to FIG. 3, the supporting device 70 is mounted on the placement portion 15. The supporting device 70 is capable of moving between a resisting position for supporting the handset 30 and an unresisting position for disengaging from the handset 30. The supporting device 70 includes a supporting component 710 and two elastic members 730.

The supporting component 710 is slideably received in the through hole 1501 and is capable of extending into the first receiving portion 150. The supporting component 710 includes a body 711, two positioning posts 713, and a locking portion 715. The locking portion 715 and the two positioning posts 713 protrude from opposite ends of the body 711. The locking portion 715 includes a locking surface 716 for engaging with the resisting portion 311. The two positioning posts 713 perpendicularly protrude from an end of the body 711 opposite to the locking portion 715. The two elastic members 730 are sleeve on the positioning posts 713 respectively for providing a resisting force to drive the supporting component 710 to protrude out of the through hole 1501.

In assembly, the supporting component 710 is received in the through hole 1501, with the locking portion 715 extending into the first receiving portion 150 and the two positioning posts 713 received in the receiving groove 183. The two elastic members 730 are sleeved on the corresponding positioning post 713 with opposite ends abutting between the body 711 and one of the sidewalls 181 away from the through hole 1501, for providing a resisting force to drive the supporting component 710 protruding out of the through hole 1501 and extending into the first receiving portion 150.

Figure 4:
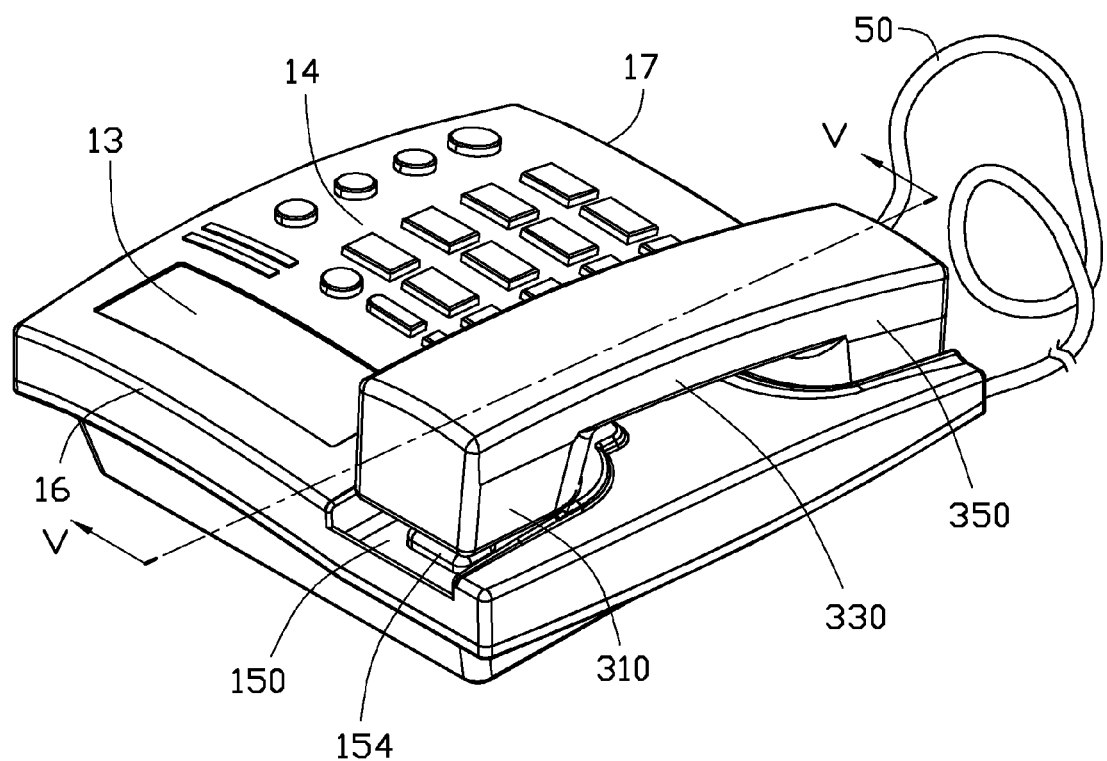
FIG. 4 is an isometric view of the telephone device of FIG. 1, showing the telephone device in a first state of use.
Figure 5:
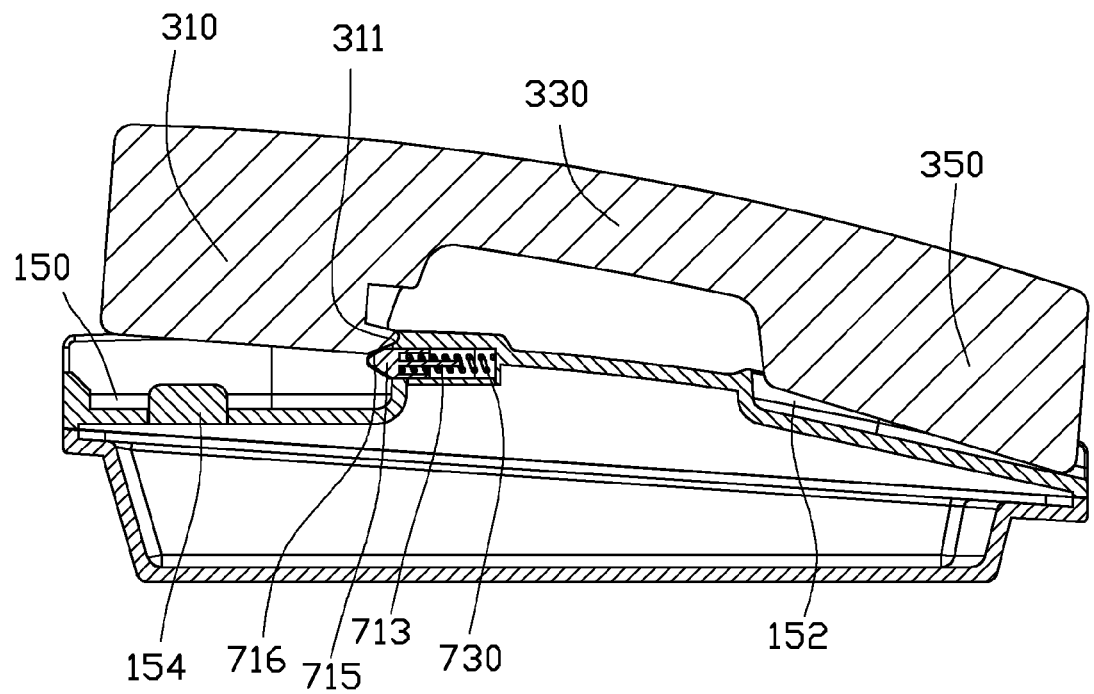
FIG. 5 is cross-sectional view taken along line V-V of FIG. 4.

Referring to FIGS. 4 and 5, in use, when a user wants to set the handset 30 down but keeps a call on, the user can put the mouthpiece 350 into the second receiving portion 152 and set the earpiece 310 on the supporting component 710, with the locking surface 716 engaging with the resisting portion 311. When the handset 30 is in this state, the supporting component 710 supports the earpiece 310 to prevent the earpiece 310 from pressing the hang-up button 154, whereby the call is prevented from being ended.

When the user wants to end the call, the user should press the earpiece 310 to drive the supporting component 710 to be retracted into the first receiving portion 150 to press the two elastic members 730. The locking portion 715 disengages with the resisting portion 311, and the hang-up button 154 is pressed down by the earpiece 310 to end the call. After the earpiece 310 is received in the first receiving portion 150, the locking portion 715 protrudes out of the through hole 1501 and is received in the recess portion 313 by the virtue of the two elastic members 730, to prevent the handset 30 from disengaging with the base 10. The call is ended when the handset 30 is in this state.

Although information and the advantages of the present embodiments have been set forth in the foregoing description, together with details of the structures and functions of the present embodiments, the disclosure is illustrative only; changes may be made in detail, especially in the matters of shape, size, and arrangement of parts within the principles of the present embodiments to the full extent indicated by the broad general meaning of the terms in which the appended claims are expressed.

What is claimed is:

1. A telephone device, comprising:
   a base comprising a first receiving portion and a hang-up button protruding out of the first receiving portion, the hang-up button used for ending a call when being pressed;
   a handset capable of positioning on the base and comprising an earpiece, the earpiece capable of being received in the first receiving portion, and;
   a supporting device secured to the base and capable of moving between a resisting position for supporting the handset and an unresisting portion for disengaging from the handset;
   wherein when the supporting device is in the resisting position, the supporting device extends into the first receiving portion for supporting the earpiece to prevent the earpiece from pressing the hang-up button; wherein when the supporting device is in the unresisting position, the supporting device retracts into the base for allowing the earpiece to press the hang-up button.

2. The telephone device as claimed in claim 1, wherein the supporting device comprises a supporting component, the supporting component is capable of protruding out of the base in the resisting position and retracting into the base of the unresisting position.

3. The telephone device as claimed in claim 2, wherein the supporting component comprises a body and a locking portion protruding from the body, the earpiece comprises a resisting portion corresponding to the locking portion, the resisting portion is capable of moving relative to the locking portion for pushing the supporting component to retract into the base.

4. The telephone device as claimed in claim 3, wherein the locking portion comprises an inclined locking surface for engaging with the resisting portion.

5. The telephone device as claimed in claim 3, wherein the earpiece comprises a recess portion, the locking portion is capable of being received into the recess portion in the unresisting position.

6. The telephone device as claimed in claim 3, wherein the supporting device comprises at least one elastic element, the at least one elastic element resists between the body and the base for providing a resisting force to drive the supporting component protruding out of the first receiving portion.

7. The telephone device as claimed in claim 6, wherein the supporting component comprises at least one positioning post protruding from an end of the body opposite to the locking portion, the at least one elastic element is sleeved on the corresponding positioning post.

8. The telephone device as claimed in claim 3, wherein the base comprises a top cover and a bottom cover opposite to the top cover, the first receiving portion is recessed in the top cover and defines a through hole, the locking portion movably receives in the through hole.

9. The telephone device as claimed in claim 6, wherein the base comprises a restriction portion mounted on the inner surface of the top cover, the through hole communicates with the restriction portion, the at least one elastic element is received in the restriction portion and resists between the body and the restriction portion.

10. A supporting device for supporting a handset of a telephone, the telephone comprises a base having a first receiving portion and a hang-up button protruding out of the first receiving portion; the hang-up button is used for ending a call when being pressed; the handset is capable of being placed on the base and comprises an earpiece, the earpiece is capable of being received in the first receiving portion; the supporting device comprising:
   a supporting device secured to the base and capable of moving between a resisting position for supporting the handset and an unresisting portion for disengaging from the handset;
   wherein when the supporting device is in the resisting position, the supporting device extends into the first receiving portion for supporting the earpiece to prevent the earpiece from pressing the hang-up button; when the supporting device is in the unresisting position, the supporting device retracts into the base for allowing the earpiece to press the hang-up button.

11. The supporting device as claimed in claim 10, wherein the supporting device comprises a supporting component, the supporting component is capable of protruding out of the base in the resisting position and retracting into the base in the unresisting position.

12. The supporting device as claimed in claim 11, wherein the supporting component comprises a body and a locking portion protruding from the body, the earpiece comprises a resisting portion corresponding to the locking portion, the resisting portion is capable of moving relative to the locking portion for pushing the supporting component to retract into the base.

13. The supporting device as claimed in claim 12, wherein the locking portion comprises an inclined locking surface for engaging with the resisting portion.

14. The supporting device as claimed in claim 12, wherein the earpiece comprises a recess portion, the locking portion is capable of being received into the recess portion in the unresisting position.

15. The supporting device as claimed in claim 12, wherein the supporting device comprises at least one elastic element, the at least one elastic element resists between the body and the base for providing a resisting force to drive the supporting component protruding out of the first receiving portion.

16. The supporting device as claimed in claim 15, wherein the supporting component comprises at least one positioning post protruding from an end of the body opposite to the locking portion, the at least one elastic element is sleeved on the corresponding positioning post.

17. The supporting device as claimed in claim 12, wherein the base comprises a top cover and a bottom cover opposite to the top cover, the first receiving portion is recessed in the top cover and defines a through hole, the locking portion movably receives in the through hole.

18. The supporting device as claimed in claim 15, wherein the base comprises a restriction portion positioned on the inner surface of the top cover, the through hole communicates with the restriction portion, the at least one elastic element is received in the restriction portion and resists between the body and the restriction portion.

* * * * *